US012567024B2

(12) United States Patent (10) Patent No.: US 12,567,024 B2
Horvat (45) Date of Patent: Mar. 3, 2026

(54) RFID BASED SEQUENCING SYSTEM AND METHOD

(71) Applicant: REAL TIME INTEL, LLC, New Kensington, PA (US)

(72) Inventor: David Horvat, New Kensington, PA (US)

(73) Assignee: REAL TIME INTEL, LLC, New Kensington, PA (US)

( * ) Notice: Subject to any disclaimer, the term of this patent is extended or adjusted under 35 U.S.C. 154(b) by 1144 days.

(21) Appl. No.: 17/049,184

(22) PCT Filed: Apr. 22, 2019

(86) PCT No.: PCT/US2019/028442
§ 371 (c)(1),
(2) Date: Oct. 20, 2020

(87) PCT Pub. No.: WO2019/204802
PCT Pub. Date: Oct. 24, 2019

(65) Prior Publication Data
US 2021/0241212 A1 Aug. 5, 2021

Related U.S. Application Data

(60) Provisional application No. 62/660,671, filed on Apr. 20, 2018.

(51) Int. Cl.
*G06Q 10/087* (2023.01)
*G06K 7/10* (2006.01)
(52) U.S. Cl.
CPC ....... *G06Q 10/087* (2013.01); *G06K 7/10366* (2013.01)

(58) Field of Classification Search
CPC ... G06Q 10/087; G06Q 10/08; G06K 7/10366
See application file for complete search history.

(56) References Cited

U.S. PATENT DOCUMENTS 7,538,676 B2 * 5/2009 Branigan ............... G06Q 10/08
340/572.1
9,740,897 B1 * 8/2017 Salour .................. G06Q 10/087
(Continued)

FOREIGN PATENT DOCUMENTS

CN 106384141 A 2/2017
KR 20070065490 A 6/2007

OTHER PUBLICATIONS

Joho, Modeling RFID Signal Strength and Tag Detection for Localization and Mapping, May 12-17, 2009, IEEE International Conference on Robotics and Automation, pp. 3160-3165 (Year: 2009).*

*Primary Examiner* — Aaron N Tutor
(74) *Attorney, Agent, or Firm* — Dentons Cohen & Grigsby P.C.; Wei Yu

(57) ABSTRACT
A system and method for sequencing of items in a vertical stack is disclosed. The RFID based sequencing system includes first and second towers positioned about a portal, each of the first and the second towers having at least two strategically, vertically spaced antennas configured to acquire information from RFID tags attached to individual assets in a vertical stack of assets. The system further includes an RFID reader in communication with the antenna and with an asset management system that stores computer executable instructions configured to determine a vertical position of each RFID tag in the vertical stack of assets as it moves through the portal between the first and second towers.

20 Claims, 11 Drawing Sheets

(56)          References Cited

U.S. PATENT DOCUMENTS

| | | | |
|---|---|---|---|
| 2005/0168385 A1* | 8/2005 | Baker | H01Q 1/1242 |
| | | | 343/700 MS |
| 2014/0067313 A1* | 3/2014 | Breed | G01P 15/02 |
| | | | 702/141 |
| 2016/0188930 A1 | 6/2016 | Zumsteg | |
| 2017/0109558 A1* | 4/2017 | Jones | G06Q 10/087 |

* cited by examiner

RFID BASED SEQUENCING SYSTEM AND METHOD

CROSS-REFERENCE TO RELATED APPLICATION

The present application is a national phase of International Application No. PCT/US2019/028442, filed Apr. 22, 2019, which claims the benefit under 35 U.S.C. § 119 (e) of prior U.S. Provisional Application Ser. No. 62/660,671, filed Apr. 20, 2018, having the title RFID BASED SEQUENCING SYSTEM AND METHOD, the content of each of which is incorporated herein by reference in its entirety in this application.

TECHNICAL FIELD

The present invention relates generally to RFID based systems and methods for sequencing vertical stacks of items.

BACKGROUND

Many tier 1 auto suppliers ship automotive parts to their auto manufacturing customers in a prescribed and required sequence. This is done so that the auto manufacturers can build to demand rather than to supply, and thus their assembly lines produce vehicles in a somewhat random order, or at least in smaller batch quantities than may have traditionally been done in the past. This requires a production schedule that is set weeks in advance. This schedule is published to the tier 1 suppliers at that time.

The supplier must load their trucks in the proper order based on this production schedule so that when unloaded, the parts may go directly to the assembly line to be immediately placed on a vehicle. This puts a significant burden on the suppliers to maintain compliance to the proper order or "sequence". Many suppliers currently facilitate this validation process via manual inspection and/or bar code scanning. Even with such validation processes in place, a typical tier 1 supplier will have several mistakes a year make it onto trucks for delivery to the auto manufacturers. These mistakes come with a very costly penalty as well as a possible expulsion from the tier 1 program to which they belong.

Therefore, there currently exists a need in the industry for a system that provides more effective, and potentially error free validation processes for tier 1 suppliers.

SUMMARY

The presently disclosed invention overcomes many of the shortcomings of the prior art by providing systems, devices and methods which provide radio frequency identification (RFID) based sequencing of vertical stacks of items.

Accordingly, the present invention is related to an RFID based sequencing system which includes two or more towers positioned around a portal (dock door), each tower comprising at least two strategically, vertically spaced antennas configured to acquire information from RFID tags attached to individual assets in a vertical stack of assets moving through the portal in a horizontal direction. The system further includes one or more RFID readers in communication with the antennas, and an asset management software system. The asset management system stores computer executable instructions configured to determine the vertical position of each RFID tag in the vertical stack of assets as it moves through the portal based at least on a signal strength from each RFID tag observed by the vertically placed antenna.

BRIEF DESCRIPTION OF DRAWINGS

Aspects, features, benefits and advantages of the embodiments herein will be apparent with regard to the following description, appended claims, and accompanying drawings. In the following figures, like numerals represent like features in the various views. It is to be noted that features and components in these drawings, illustrating the views of embodiments of the present invention, unless stated to be otherwise, are not necessarily drawn to scale. The illustrative embodiments in the following drawings are not meant to be limiting; other embodiments may be utilized and other changes may be made without departing from the spirit or scope of the subject matter presented herein.

DETAILED DESCRIPTION

Figure 1:
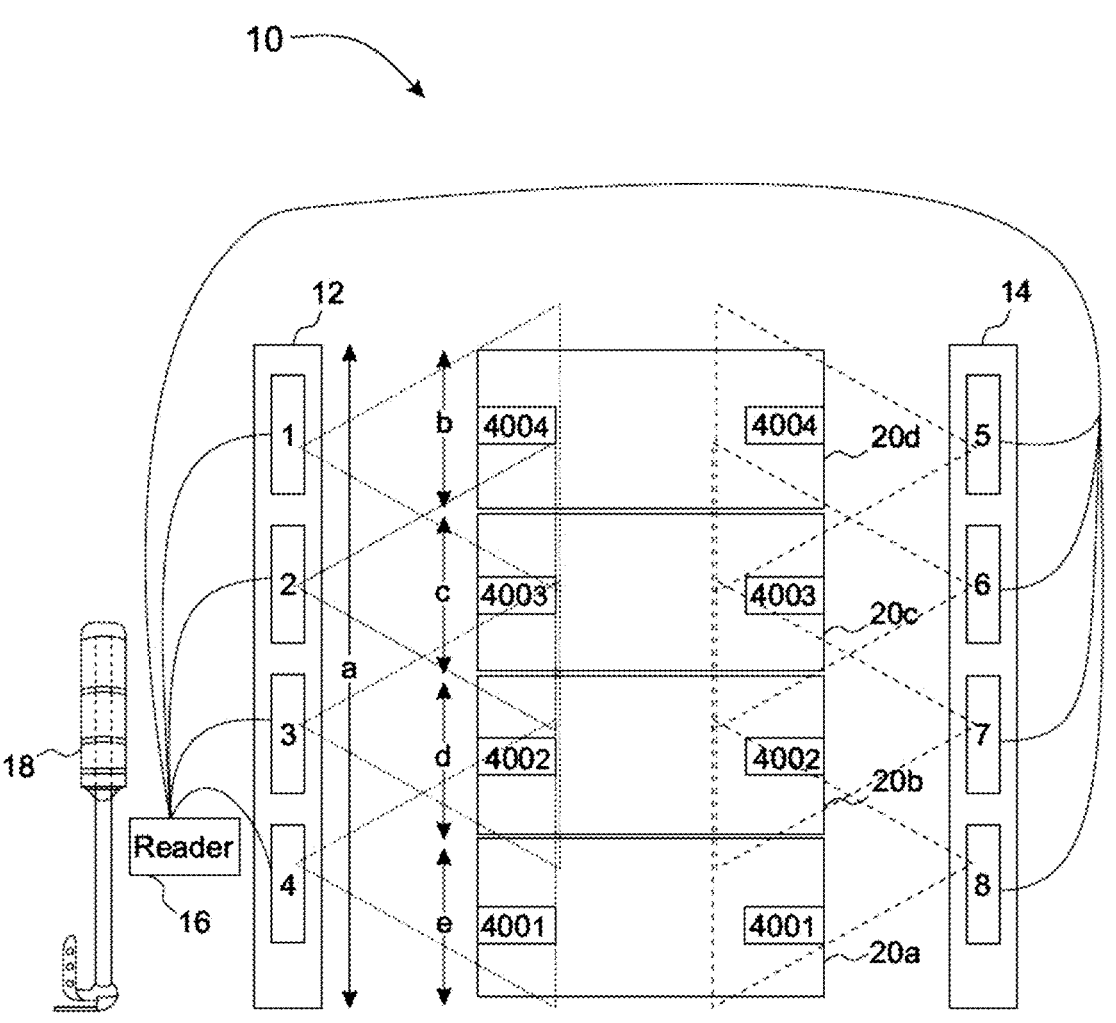
FIG. 1 illustrates an exemplary RFID based sequencing system according to certain aspects of the present invention, wherein the detection range for tags on a vertical stack of assets by individual antenna of the system is depicted.

In the following description, the present invention involves systems and methods for a radio frequency identification (RFID) based sequencing system and methods of use thereof. The above summary and drawings are not intended to describe or show each illustrated embodiment or every possible implementation of the presently disclosed systems and methods. Rather, various aspects of the systems and methods disclosed herein are described and illustrated with reference to one or more exemplary implementations. As used herein, the term "exemplary" means "serving as an example, instance, or illustration," and should not necessarily be construed as preferred or advantageous over other variations of the devices, systems, or methods disclosed herein. "Optional" or "optionally" means that the subsequently described component, event, or circumstance may or may not occur, and that the description includes instances where the event occurs and instances where it does not. In addition, the word "comprising" as used herein means "including, but not limited to".

Various aspects of the systems disclosed herein may be illustrated by describing components that are coupled, attached, and/or joined together. As used herein, the terms "coupled", "attached", and/or "joined" are interchangeably used to indicate either a direct connection between two components or, where appropriate, an indirect connection to one another through intervening or intermediate components. In contrast, when a component is referred to as being "directly coupled", "directly attached", and/or "directly joined" to another component, there are no intervening elements shown in said examples.

Relative terms such as "lower" or "bottom" and "upper" or "top" may be used herein to describe one element's relationship to another element illustrated in the drawings. It will be understood that relative terms are intended to encompass different orientations of aspects of the systems in addition to the orientation depicted in the drawings. By way of example, if aspects of the RFID tower shown in the drawings are turned over, elements described as being on the "bottom" side of the other elements would then be oriented on the "top" side of the other elements as shown in the relevant drawing. The term "bottom" can therefore encompass both an orientation of "bottom" and "top" depending on the particular orientation of the drawing.

It must also be noted that as used herein and in the appended claims, the singular forms "a", "an", and "the" include the plural reference unless the context clearly dictates otherwise. For example, although reference is made herein to "a" reader, "an" antenna, or "the" portal, one or more of any of these components and/or any other components described herein can be used.

Unless defined otherwise, all technical and scientific terms used herein have the same meanings as commonly understood by one of ordinary skill in the art.

The present invention provides an RFID based system and method capable of providing validation of an order of assets, i.e., sequence, in a vertical stack of assets as the stack moves through the horizontal plane, such as in loading and unloading operations during shipment. The system and method are based on RFID identification of asset tags attached to each asset in the stack of assets, and control logic which sequences these tags and compares the sequence in the stack with a desired sequence, such as sequences provided in an inventory manifest.

Generally, RFID refers to a wireless, non-contacting system for transferring data by way of radio frequency electromagnetic fields. In an RFID system, data transfers occur in the form of modulated signals transmitted between an RFID tag (or an RFID device), which may include various communication components, logic or circuitry, and an RFID reader, which may include antennas or other like devices. Data stored within a microchip or other storage device associated with the RFID tag may be sent to the RFID reader, which may interpret not only the data received in the RFID signal but also other relevant information or attributes of the RFID signal, such as an intensity or a frequency of the RFID signal, as well as a direction from which the RFID signal originated and a range traveled by the RFID signal. The transfer of the RFID signal is initiated when an electric field or a magnetic field transmitted by an RFID reader is sensed by an RFID tag, which transmits information or data that may be stored in association with the RFID tag in one or more microchips or other storage devices.

RFID tags can be classified as either active or passive. This classification describes the tag's power source and how the tag sends information to readers. Active tags have an internal transmitter powered by an onboard battery while passive tags are powered by an external reader's signal. In passive tags, the reader's transmission energizes the tag's antenna, which in turn resonates back a corresponding signal. RFID tags and readers are typically designed to transmit data on a fixed frequency band. Frequency impacts both read rate and distance. Lower frequency tags typically have shorter read distances and slower data transfer rates than higher frequency tags. Passive tags are usually classified depending upon the frequency band in which they operate.

An RFID reader or interrogator retrieves information stored on a tag through a radio frequency signal picked up by the reader's antenna. How this data signal is generated depends on the tag being read. An active reader receives signals broadcast by the tag's internal RF transmitter. Some active tags broadcast their signals continuously without regard to whether there is a reader within receiving range. Other active tags require a prompt signal from a reader before broadcasting their data stream.

A passive reader transmits a signal strong enough to energize the target tag's antenna and circuitry. The tag resonates the signal back to the reader in a slightly modified form that is decoded to extract the data stream. Since they provide the energy for the tag's transmission, passive readers must have a considerably more powerful signal than active readers. An RFID reader is capable of reading multiple tags within its transmission field.

There are several advantages of RFID over optical barcode identification. For example, no line-of-sight is required between an RFID reader device and the tag, and the RFID reader can read hundreds of tags at a time. Moreover, RFID tags can be either programmed with a fixed set or packet of "read-only" data which may be transmitted to an RFID reader countless number of times, or reprogrammed with modifiable sets of data that may be written and rewritten, as needed, based on the application in which the RFID tag is provided.

The present inventors have integrated the use of such RFID technology to provide a system and method for sequencing of vertical stacks of items or bins ("assets"). For example, and with reference to FIG. 1, the present invention is directed to a sequencing system 10 that includes at least two horizontally spaced towers (12, 14), each of which include at least two vertically spaced RFID antenna (antenna 1-8 in FIG. 1). One or more RFID readers 16 may be in communication with the antenna (1-8). The antenna (1-8) in each tower (12, 14) may collect data related to a signal strength from each RFID tag. Comparison of the relative signal strength from each RFID tag and the relative elevation, i.e., vertical position on the tower, for each antenna allows the system to determine a vertical order of assets in the stack.

Figure 5:
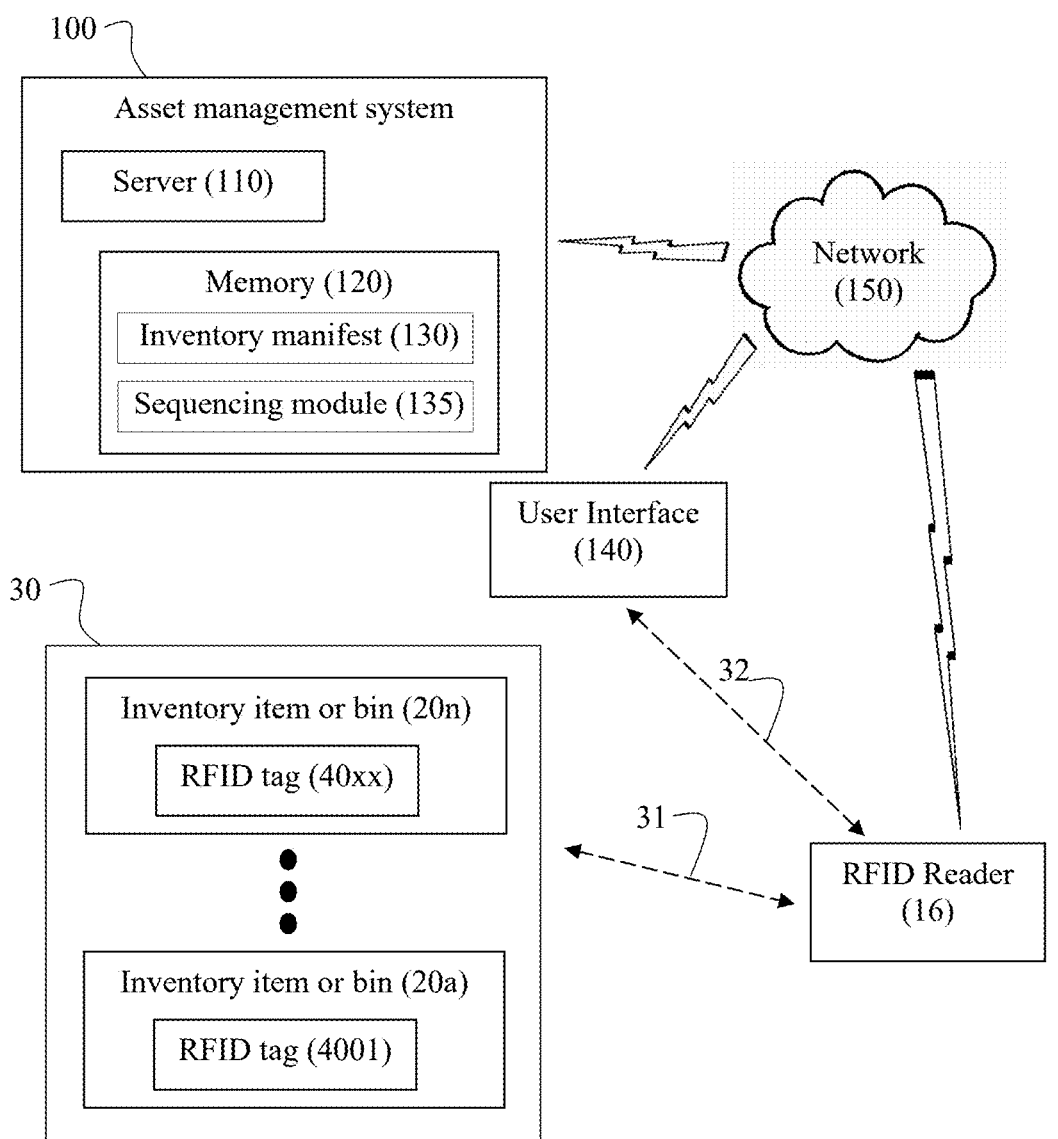
FIG. 5 illustrates an example block diagram of an RFID based sequencing system according to certain aspects of the present invention.

With reference to FIG. 5, the sequencing system 10 may further include an asset management system 100 that includes a server 110 comprising at least one processor, and a memory 120. The memory 120 may store an inventory manifest 130 and computer-executable instructions 135 configured to determine the vertical order of individual RFID tags (e.g., 4001 to 40xx) attached to the individual assets (20a to 20n) in the vertical stack of assets 30. The at least one processor on the server 110 may be configured to communicate with the RFID reader 16, and may be configured to execute the computer-executable instructions to determine a vertical order of RFID tags in the vertical stack of assets as it moves through the portal in the horizontal direction.

Figure 6:
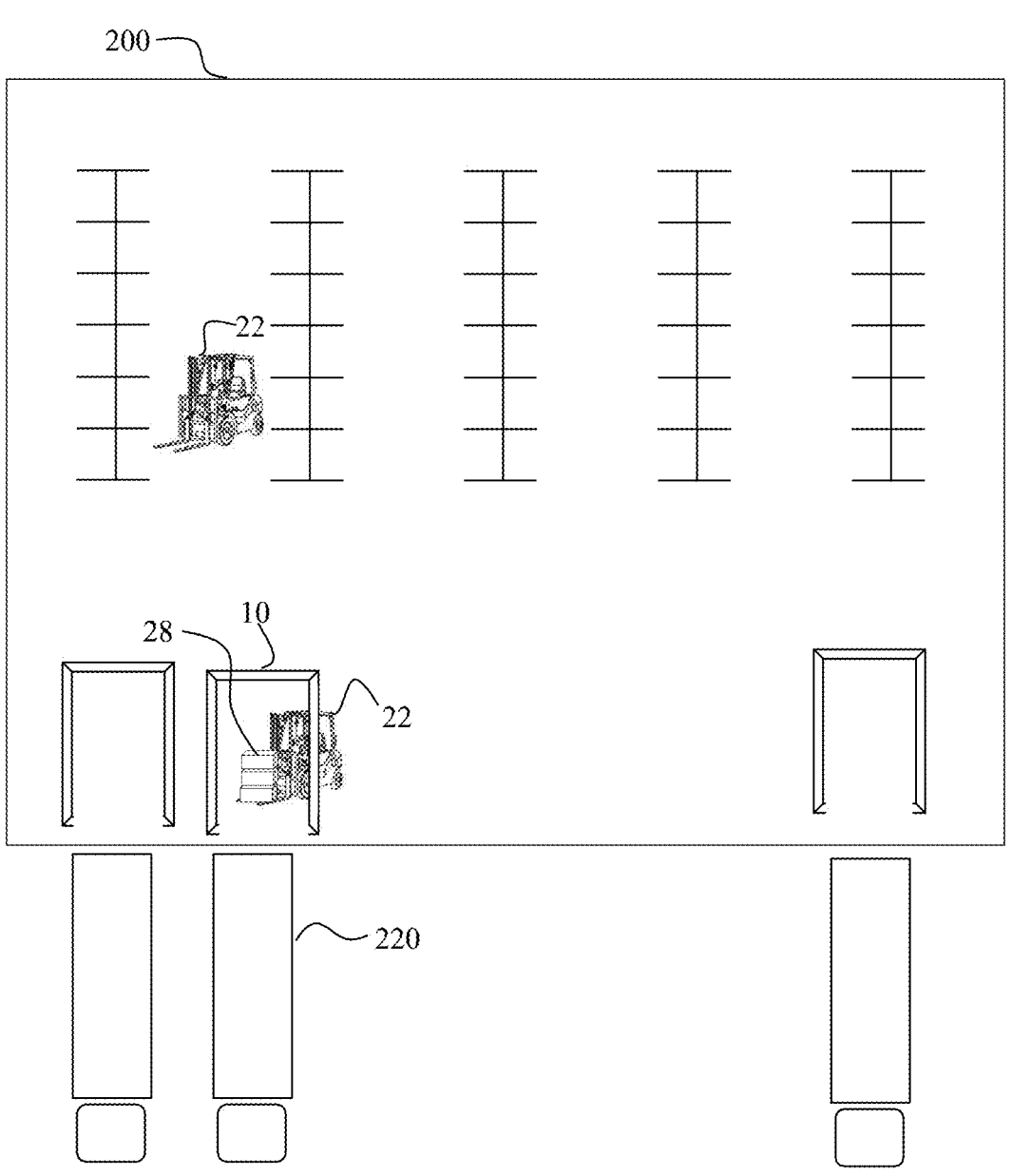
FIG. 6 illustrates an exemplary configuration for an RFID based sequencing system according to certain aspects of the present invention.

The horizontal spacing between the towers is designed to allow the vertical stack of assets to pass therebetween. According to certain aspects of the present invention, this spacing may be sufficient to allow a vehicle transporting the vertical stack, such as a forklift, to pass (see forklift 215*b* in FIG. 6). The vertical spacing between the antennas in each tower is optimized to "read" or "listen" for signals from the RFID tags on each asset so that the assets may be sequenced with maximal efficiency and accuracy. As shown in FIG. 1, each antenna may be spaced apart within a tower (12, 14) having a specific height ("a") so that read regions for each antenna may overlap with read regions of a neighboring antenna (triangular read regions shown in the figure in dotted lines). Thus, as vertical stacks of assets (i.e., items or bins) pass between the at least two towers (12, 14), RFID tags (4001-4004) on each asset having a specific height (b-e) may be read by more than one antenna (1-8).

While FIG. 1 depicts each tower as including four antenna (1-4 and 5-8), the presently disclosed system may include more than four antenna per tower, such as 5 to 12 antenna per tower, or even more. Additionally, the presently disclosed system may include less than four antenna per tower, such as 2 or 3. The height (a) of each tower (12, 14) and the vertical spacing (b-e) of each antenna (1-8) within each tower may vary and may depend on at least an expected maximum number of assets in each vertical stack, an expected height of each asset or stack of assets, a total number of antenna on each tower, etc.

Moreover, while FIG. 1 shows a single reader 16 in communication with all of the antenna (i.e., all 8 antenna from both towers), the presently disclosed system may include more than one reader, such as one reader for each tower, or one reader for several sets of antenna, or one reader for each antenna.

In an exemplary configuration, the system of the present invention may be stationary and may be positioned at portals for loading and unloading procedures within a supplier warehouse. For example, and with reference to FIG. 6, each tower of the sequencing system 10 may be placed on either side of a dock door (i.e. left and right sides of the dock door in warehouse 200), and the system may verify and validate loads as they pass through the dock door on their way to being placed onto a truck, such as a load 28 on forklift 22 passing through the system 10 on its way to a truck 220. The vertical stack of assets passes between the towers, i.e., travel in a horizontal plane, without additional rotational and/or vertical movement.

The system may further include a visual indicator, such as an indicator light (18 of FIG. 1), configured to indicate a pass state or a fail state. That is, the system may visually and/or audibly indicate whether the vertical stack of assets passing between the towers of the system 10 does or does not comply with the prescribed order as listed in an inventory manifest 130. The pass state indicates the vertical order of individual RFID tags attached to the individual assets in the vertical stack of assets matches a desired order as listed in the inventory manifest. Alternatively, the fail state indicates the vertical order of individual RFID tags attached to the individual assets in the vertical stack of assets does not match the desired order as listed in the inventory manifest.

Figure 2A:
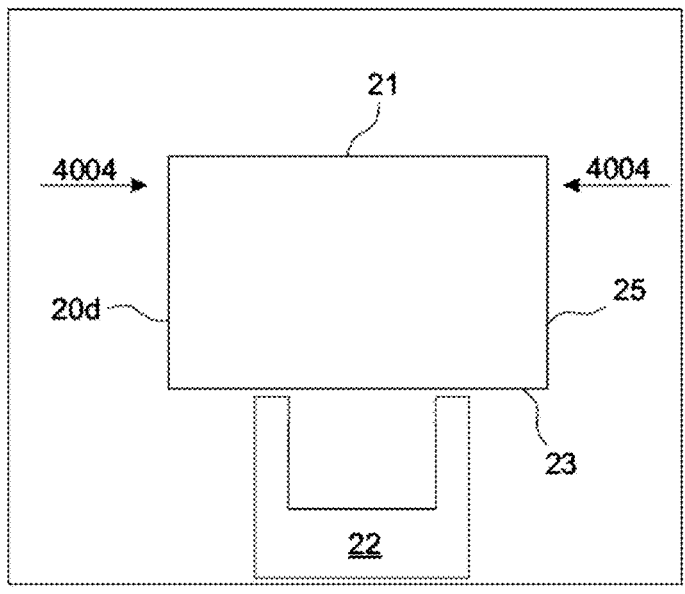
FIGS. 2A and 2B illustrate exemplary positioning of tags on assets in a stack of assets to be sequenced by the RFID based sequencing system according to certain aspects of the present invention.
Figure 2B:
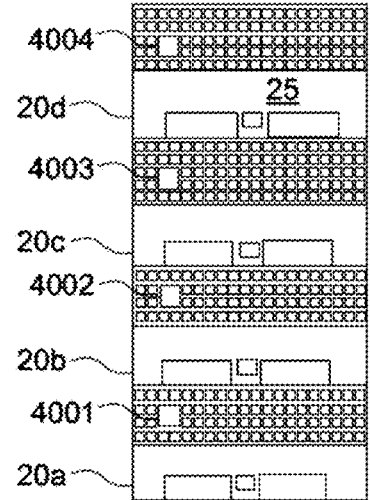

The assets in the stack of assets to be read by the sequencing system of the present invention may include at least one RFID tag per asset. According to certain aspects, the assets may include two RFID tags, wherein each tag is positioned on a side of the asset (25), such as the sides closest to the towers as the stack of assets pass therebetween. For example, as shown in FIGS. 2A and 2B, each asset (20*a*-20*d*) may include two RFID tags (4001-4004) affixed to opposite sides of the asset, wherein a front of the asset 21 may face away from a rear 23 of the asset that is closest to the forklift 22 that moves the stack through the space between the towers. Optimally, the tags would face outward on the assets, and would be positioned on sides 25 most proximate the towers as the stack of assets passes between the towers, but this is not required. The RFID tags may also include human readable values such as a product description, SKU number, and/or vendor name. The RFID tags may also include a bar code (e.g., a Universal Product Code (UPC), International Article Number (EAN), Global Trade Item Number (GTIN), or Serialized Global Trade Item Number (SGTIN); and 2D or 3D barcodes).

With continued reference to FIG. 1, the antennas inside each tower may be positioned at precise predetermined locations to produce specific "read zones" for later interpretation (shown as shaded regions in FIG. 1). For example, according to certain aspects of the present invention, the sequencing system may be designed to include an RFID configuration that consists of four (4) antennas stacked on each side of a dock door in a tower. The antennas inside each stack may be positioned at precise predetermined locations that may produce specific "read zones".

Due to the unpredictability of the movement of the energy field produced by each antenna, there is a high probability that each antenna in an array will locate, or read, more than one tag as the tagged assets pass through the read range. The presently disclosed invention uses the relative strengths of each read zone to determine the proper settings to assign to each antenna. The system may manage the behavior of these antennas and their read zones, and may use comparisons of the signal strengths from each tag read by an antenna against all antennas that have seen the tag, as well as all other tags also seen by any and all antennas to determine its final relative position as it relates to all other tags (see discussion below with reference to FIGS. 4A-4C).

Figure 3:
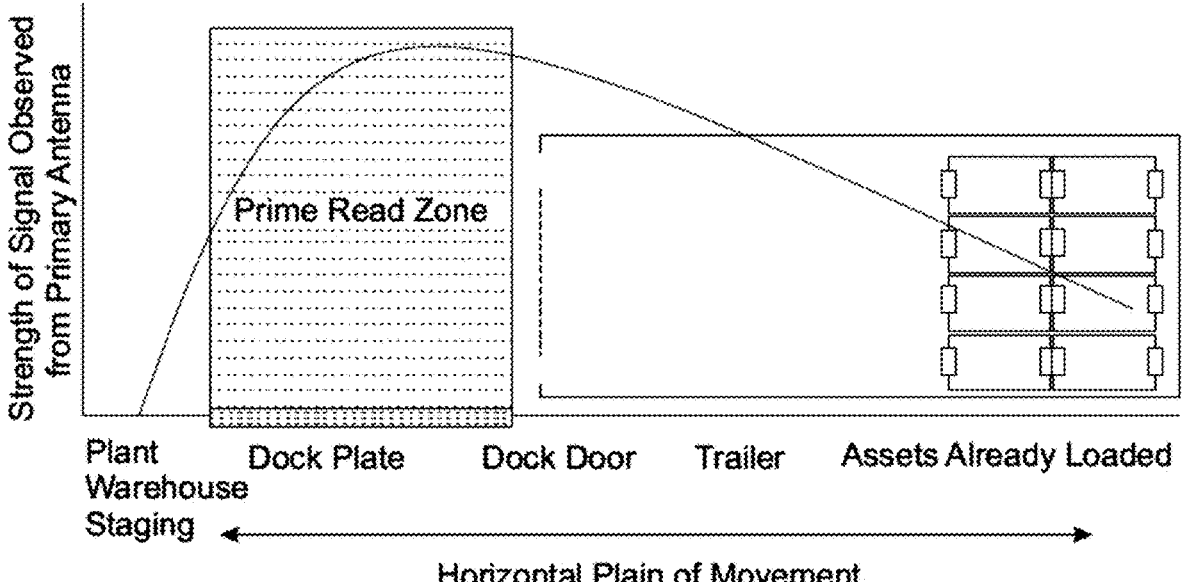
FIG. 3 illustrates signal strength from a tag observed by a single antenna as a function of horizontal distance from the antenna (i.e., portal) of the RFID based sequencing system according to certain aspects of the present invention.

With reference to FIG. 3, the system may further provide determination of the identity and position of assets in a stack of assets that are moving off of a trailer versus those that are new entries onto the trailer. The system may accomplish this by first recognizing if it is an asset that has already been read on a prior approved trip versus a new asset. With that information, the system may then apply different thresholds for signal strength to "accept" a read as one of interest. FIG. 3 illustrates the dynamic nature of signal strength as a function of horizontal position relative to the sequencing system (i.e., antenna in the two towers). The assets that are on the truck report back at a much stronger signal further away due to the signal bounce created by the inside surfaces of the truck. As such, the system may use a different set of criteria based on where the asset signal appears to be coming from.

Figure 7A:
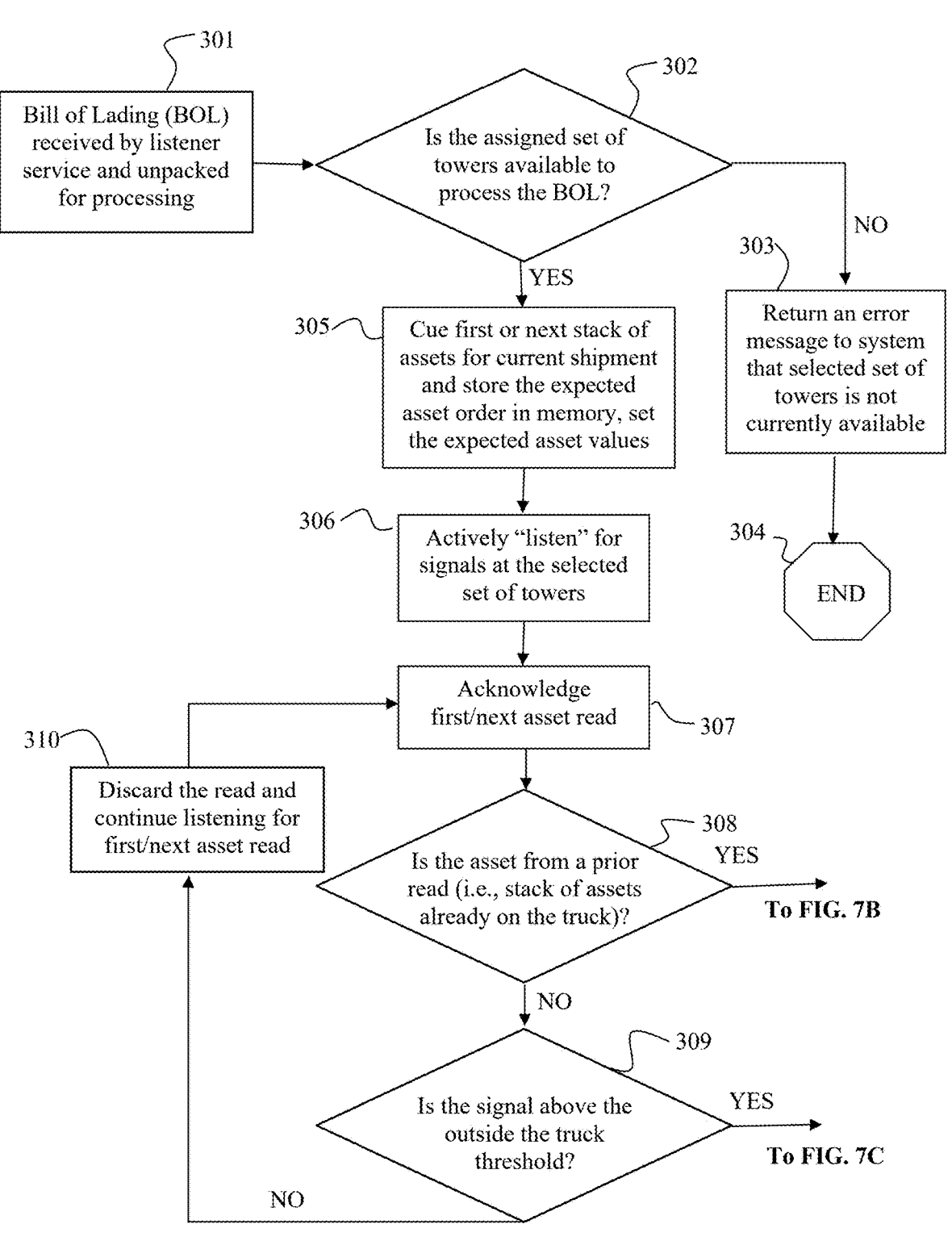
FIGS. 7A-7C illustrate flow charts outlining control logic used to determine proper assignment of tag locations within a vertical stack of tags according to certain aspects of the present invention.
Figure 7B:
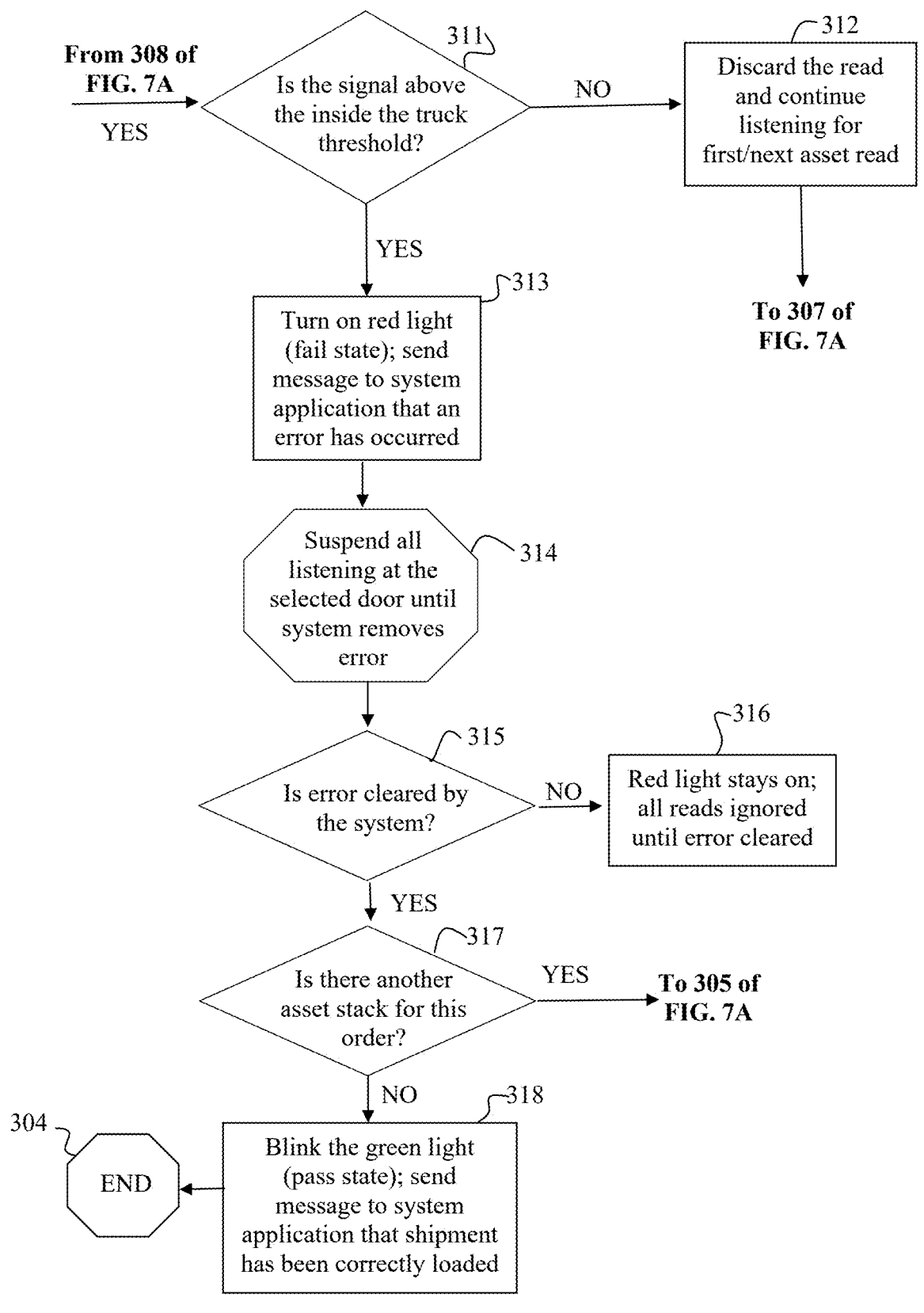
Figure 7C:
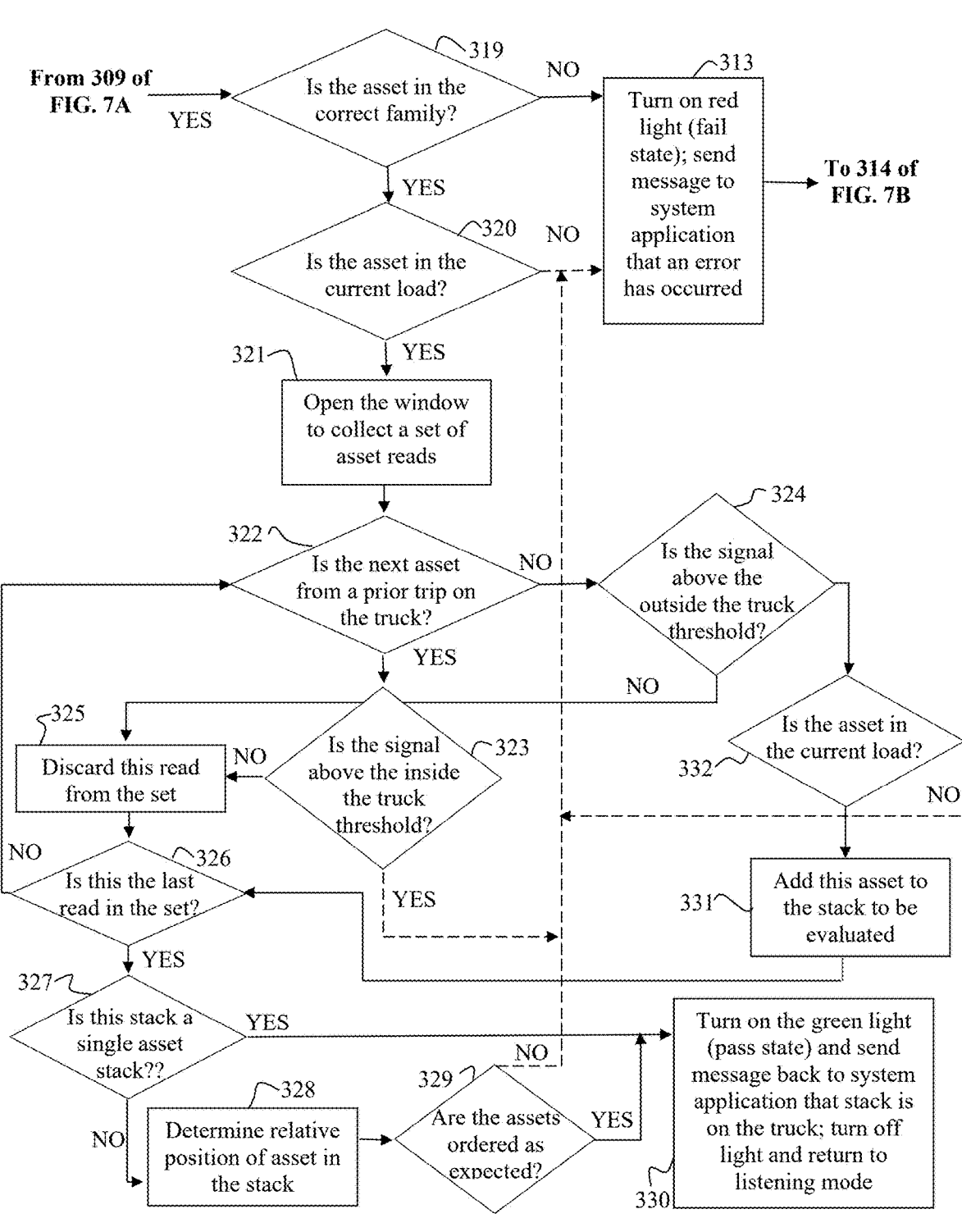

The sequencing system may include a memory and one or more processors as shown and discussed above with reference to FIG. 5. The memory may comprise computer program instructions executable by the one or more processors to receive data from at least the RFID reader via a communication interface, which may be wired or wireless, or a combination thereof. With reference to FIGS. 7A-7C, control logic used by an exemplary embodiment of the sequencing system is shown for sequencing operations on a loading dock. The flow charts of FIGS. 7A-7C show a portion of the programming logic set used to determine proper assignment of locations when verifying the sequence.

For example, as listed in step 301 of FIG. 7A, the system may receive a bill of lading (BOL) for a specific shipment to be packed onto a truck for transport (stack of assets). A set of at least two towers surrounding a specific door may be assigned to process or scan the stack of assets, and the system may check that the towers are available (step 302). If the towers are not available, the system may return an error message (step 303) and end the program (304), and/or may query for a different set of towers to be used (i.e., restart at step 302).

If the assigned set of towers of the system are available, the stack of assets may be scanned as they pass between the towers, as shown in step 305 (i.e., the antenna in the two towers may "listen" for a signal from the RFID tags on the assets in the stack of assets). The expected values for a vertical position of each asset, as defined in the inventory manifest or BOL, may be stored in a memory of the system. As the stack of assets passes between the towers, the RFID antenna and reader receive signals returned from the RFID tags on the assets (step 306). The system may acknowledge that asset reads are progressing as indicated in step 307.

As indicated in FIG. 3, and listed in step 308, the system will determine whether it is receiving signals from a prior stack of assets, such as a stack that has already passed between the towers and may be on the truck, for example. If this is the case, the system will determine if the signal is above an expected threshold strength for assets that may already be on the truck, as shown at step 311 in FIG. 7B. This threshold value may be one that is known from calibration of the system, or from prior reads on stacks of assets from recent reads. If it is determined that the signals are from a stack of assets that have already been read, i.e., below the inside the truck threshold (step 311), such as from a stack that is currently on the truck, or a stack that is being actively loaded, the RFID signals received by the antenna may be discarded (step 312), and the system may continue to "listen" for additional signals from stacks of assets (step 307; FIG. 7A).

With reference again to FIG. 7A, if the signals are not from a prior read (step 308), the system may determine if the signal strength is above an outside the truck threshold, as shown in step 309. If not, the RFID signals received by the antenna may be discarded (step 310), and the system may continue to "listen" for additional signals from stacks of assets (step 307).

As shown in step 311 of FIG. 7B, if the system determined that the signal strength "read" by the antenna of the two towers is above an inside the truck signal strength threshold, the system may turn on a red light (fail state) and send a message to the system application (100; refer to FIG. 5) that an error has occurred (step 313). Additionally, the system application may suspend all further listening or scanning at that set of towers until the error is cleared (steps 315, 316). Once the error is cleared, the system may query for another stack of assets to be scanned at step 317, and may restart the process again, as shown in step 305 on FIG. 7A. If the error is not cleared (step 315), the red light may stay on (step 316) and all reads from that set of towers will be ignored until the error, i.e., fail state, is remedied (e.g., prior stack of assets stuck on or near the read area, or being removed from the truck, etc.).

With continued reference to FIG. 7B, once the error is cleared at step 315, and the system application determines that there are no other stacks of assets for this order, such as shown at step 317, the system may signal a pass state on a visual indicator (18 of FIG. 1), such as a green light at step 318. The system may further send a message to the system application that the shipment has been correctly loaded (end of sequencing, step 304), and/or that the set of towers is available for another read/processing of stacks of assets.

If the system finds that there are additional asset stacks to be processed in the order (BOL; see step 317), the system may cue the next set of assets for shipment and retrieve/ review the expected asset sequence values, as in step 305 of FIG. 7A.

Referring back to FIG. 7A, if, after an initial signal is detected as in step 307, it is determined that the asset is not from a prior read, as in step 308, the system may determine if the signal strength is above an outside the truck threshold, as in step 309. If the signal from the stack of assets is above the outside the threshold, the system may then query to determine if the stack of assets comprises the correct items (correct family, step 319), and in the correct load (e.g., correct truck; step 320), as shown in FIG. 7C.

If both queries are negative, the system turns on the red light (fail state, step 313) and suspends all listening at the selected set of towers (e.g., which may surround a bay door in the facility). The system may also send an error message to the system application. If both queries are positive (correct family; correct load), the system may collect a set of signals from the RFID tags on the assets at the antenna of the two towers, such as at step 321, and determine if they are from a prior set of assets on the truck (step 322). These signals may be re-evaluated, as in steps 323 and 324 for signal threshold. If the signal strengths are not above an in-truck and outside of truck threshold, the values are discarded as before (step 325). If however, the signals strengths are above the outside of truck threshold value, the measured values are evaluated to determine a vertical order of that asset in the stack of assets read (steps 326-332).

The system may compare this measured vertical order with an expected vertical order (step 329) as defined in the inventory manifest. If the measured order matches the expected order, the system may provide a visual (e.g., green light; 330) or audible indication that the stack of assets "passes", and these assets may then be put onto the truck for transport. If the measured order does not match the expected order, the system may provide a visual (e.g., red light; 313) or audible indication that the stack of assets "failed", and these assets may be held within the warehouse for manual evaluation, and would not be put onto the truck for transport.

Figure 4A:
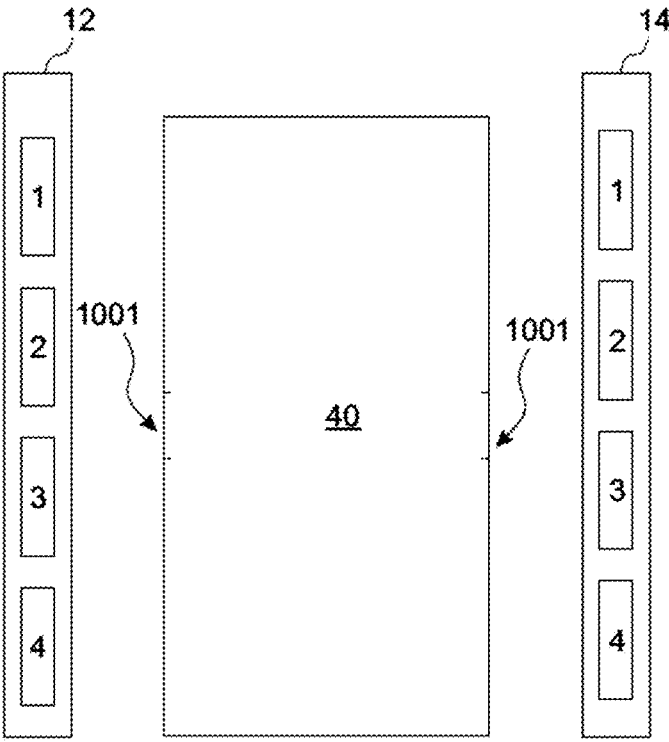
FIG. 4A-4C illustrate exemplary stacks of assets within a portal of the RFID based sequencing system according to certain aspects of the present invention.

With specific reference to FIGS. 4A-4C, methodology for determining the position for specific assets on the stack will be described. In FIG. 4A, which includes only a single asset 40 in the stack, the antenna (1-8) will detect the RFID tag (1001 on each side of the asset), and the system may then provide information regarding an identity of the asset to which the tag(s) is affixed.

Figure 4B:
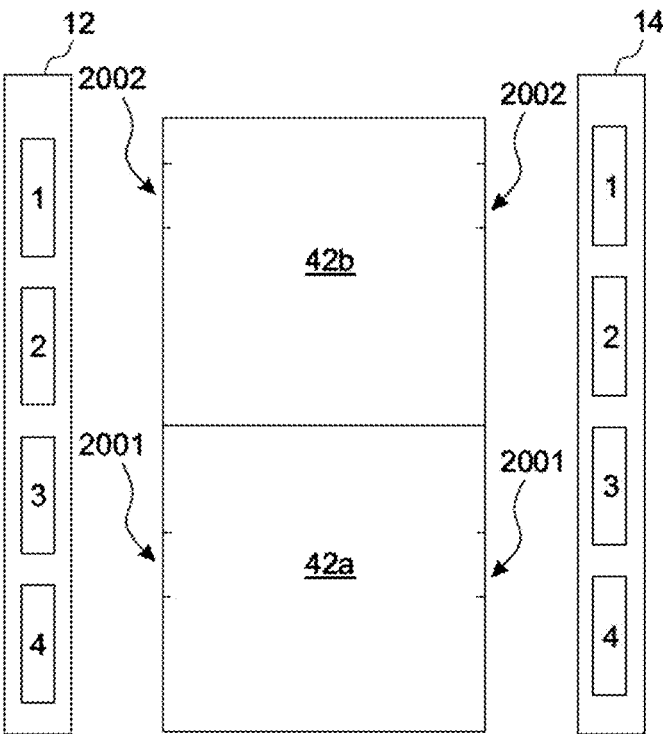

In FIG. 4B, a stack of two assets (42a, 42b) is passed through the portal (i.e., space between the two towers with vertically positioned antennas), wherein each asset has a tag on the left side and a tag on the right side (2001, 2002). For each tag, the system may determine the strongest signal received by each antenna at the left tower 12 and at the right tower 14. If the signal strengths are the same on both sides, the system will assign a position number within the stack. For example, if tag 2002 has the strongest signal on antenna 1 on both sides, then the asset 42b with tag 2002 is assigned the top position.

If the signal strengths are different, the system will find the second strongest value on each side and assign an average of the strongest and the second strongest position on each side to that side, and will then average those two values to place the tags in a final vertical position. For example, if tag 2001 has the strongest signal on antenna 3 on the left side and antenna 4 on the right side, the system would check the second strongest signal on each side. If the second strongest signal on the left is from antenna 4, then the left side value for tag 2001 would be assigned the value of 3.5, and if the second strongest signal on the right is 3, then tag 2001 would be assigned the value of 3.5 on the right. The average of the two side would be 3.5. This would return the asset 42*b* with tag 2002 as on the top and the asset 42*a* with tag 2001 as on the bottom of the vertical stack.

In yet another example, if tag 2001 has the strongest signal at antenna 1 on the left and at antenna 2 on the right, and the second strongest signal at antenna 2 on the left and at antenna 3 on the right, the average value at the left would be 1.5 and the average value at the right would be 2.5. In this case, the system would assign the average of the two values, 2.0, to tag 2002, and would position the asset 42*b* with tag 2002 on top of the asset 42*a* with tag 2001.

In the unlikely event that tag 2001 has an odd result wherein the strongest signal on the left is from antenna 1, and on the right is from antenna 3, and for both sides the second strongest signal is from antenna 4, then the left would have an average value of 2.5, and the right would have an average value of 3.5. This would provide a final read value of 3.0. In this scenario, the asset 42*b* with tag 2002 would still be positioned on top of the asset 42*a* with tag 2001.

Figure 4C:
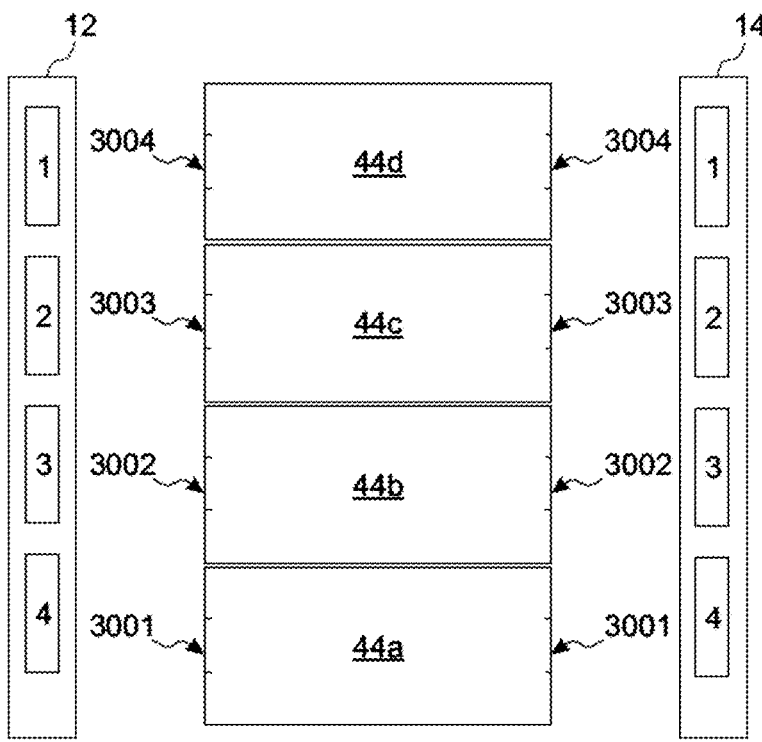

FIG. 4C shows a stack of four assets (44*a*-44*d*) with tags (3001-3004, respectively) passing through the portal (12, 14). As was detailed above, the system may read values from each antenna, which are then compared and averaged for each tag to determine a position of the tag, and thus the tagged asset, within the vertical stack. That is, the strongest signal on the left (tower 12) and the strongest signal on the right (tower 14) is determined for each set of matched antenna. If the signals on both sides are the same, i.e., strongest signal detected at the matched antenna (i.e., antenna on eat tower that are at the same elevation), then the tag is assigned that antenna number. If they differ, the system will find the second strongest signal value from each tower (i.e., which antenna detected the second strongest signal from that tag), and assign an average of the strongest and second strongest antenna numbers from each tower, and average that value for the two towers.

Implementations of the RFID based sequencing system are described within the context of a device configured to perform various steps, methods, and/or functionality in accordance with aspects of the described subject matter. It is to be appreciated that a sequencing system including a computing device or computer system can be implemented by one or more computing devices. Implementations of the sequencing system can be described in the context of a "device configured to", wherein the term configured may be taken to mean that the device can implement computer-executable instructions that are executed to perform various steps, methods, and/or functionality in accordance with aspects of the described subject matter.

In general, a computer system or computing device can include one or more processors and storage devices (e.g., memory and disk drives; see 110 and 120, respectively, of FIG. 5) as well as various input devices, output devices, communication interfaces, and/or other types of devices (see user interface 140, networks 150 and 31, 32 of FIG. 5). A computer system or computing device can also include a combination of hardware and software. As such, it should be appreciated that various types of computer-readable storage media can be part of a computer system or computing device. As used herein, the terms "memory", "computer-readable storage media" and "computer-readable storage medium" do not mean and unequivocally exclude a propagated signal, a modulated data signal, a carrier wave, or any other type of transitory computer-readable medium. In various implementations, the sequencing system may include a processor configured to execute computer-executable instructions and a computer-readable storage medium (e.g., memory and/or additional hardware storage) storing computer-executable instructions configured to perform various steps, methods, and/or functionality in accordance with aspects of the described subject matter.

Computer-executable instructions can be embodied and/or implemented in various ways such as by a computer program (e.g., client program and/or server program), a software application (e.g., client application and/or server application), software code, application code, source code, executable files, executable components, routines, application programming interfaces (APIs), functions, methods, objects, properties, data structures, data types, and/or the like. Computer-executable instructions can be stored on one or more computer-readable storage media and can be executed by one or more processors, computing devices, and/or computer systems to perform particular tasks or implement particular data types in accordance with aspects of the described subject matter.

The sequencing system can implement and utilize one or more program modules. Generally, program modules include routines, programs, objects, components, data structures, etc., that perform particular tasks or implement particular abstract data types. For example, the sequencing system includes at least a sequencing module (see 135 of FIG. 5) that includes computer-executable instructions to determine a vertical order of RFID tags in the vertical stack of assets as it moves through the portal in the horizontal direction The sequencing system can be implemented as a distributed computing system or environment in which components are located on different computing devices that are connected to each other through network (e.g., wired and/or wireless) and/or other forms of direct and/or indirect connections. In such distributed computing systems or environments, tasks can be performed by one or more remote processing devices, or within a cloud of one or more devices, that are linked through one or more communications networks. In a distributed computing environment, program modules can be located in both local and remote computer storage media including media storage devices. Still further, the aforementioned instructions can be implemented, in part or in whole, as hardware logic circuits, which can include a processor.

The sequencing system can be implemented by one or more computing devices such as computers, PCs, server computers configured to provide various types of services and/or data stores in accordance with aspects of the described subject matter. Exemplary sever computers can include, without limitation: web servers, front end servers, application servers, database servers, domain controllers, domain name servers, directory servers, and/or other suitable computers.

Components of the sequencing system can be implemented by software, hardware, firmware or a combination thereof. For example, the sequencing system can include components implemented by computer-executable instructions that are stored on one or more computer-readable storage media and that are executed to perform various steps, methods, and/or functionality in accordance with aspects of the described subject matter.

The sequencing system can include a controller, memory, additional hardware storage, input devices, and output devices. Input devices can include one or more of the exemplary input devices described above and/or other type of input mechanism and/or device. Output devices can include one or more of the exemplary output devices described above and/or other type of output mechanism and/or device.

The sequencing system can contain one or more communication interfaces that allow the sequencing system to communicate with other computing devices and/or other computer systems. For example, and with reference to FIG. 5, the system may provide communication between a user interface 140 and the asset management system 100 on a local network (LAN) or across the internet. As such, the system may be provided locally or on a cloud based system, or any combination thereof (i.e., run executable files locally using cloud based data, or vice versa).

The sequencing system can include and/or run one or more computer programs implemented, for example, by software, firmware, hardware, logic, and/or circuitry of the sequencing system. Computer programs can include an operating system implemented, for example, by one or more exemplary operating systems described above and/or other type of operating system suitable for running on computing device. Computer programs can include one or more applications.

While specific embodiments of the invention have been described in detail, it should be appreciated by those skilled in the art that various modifications and alternations and applications could be developed in light of the overall teachings of the disclosure. Accordingly, the particular arrangements, systems, apparatuses, and methods disclosed are meant to be illustrative only and not limiting as to the scope of the invention. For example, while the systems and methods of the present invention have been described as useful for sequencing of assets for loading onto a truck, they may easily find use in other loading operations or other sequencing needs as would be understood by someone of ordinary skill in the art.

The following aspects are disclosed in this application:

Aspect 1: An RFID based sequencing system comprising: a first tower comprising at least two vertically spaced antennas configured to transmit RFID signals to acquire information from RFID tags attached to individual assets in a vertical stack of assets; a second tower comprising at least two vertically spaced antennas configured to transmit RFID signals to acquire information from RFID tags attached to the individual assets in the vertical stack of assets; and an RFID reader in communication with each antenna of the first and second towers, wherein the first and second towers are stationary and are horizontally spaced apart from each other such that the vertical stack of assets can pass therebetween.

Aspect 2: The system according to aspect 1, further comprising an asset management system comprising at least one processor configured to communicate with the RFID reader, and a memory that stores an inventory manifest and computer-executable instructions configured to determine a vertical order of individual RFID tags attached to the individual assets in the vertical stack of assets.

Aspect 3: The system according to aspects 1 or 2, wherein the vertical order of individual RFID tags is determined by comparison of a signal strength from each RFID tag received by the vertically spaced antennas and a known elevation of each antenna in the first and second towers.

Aspect 4: The system according to aspects 1 or 2, wherein the vertically spaced antennas on the first tower are configured to acquire a signal strength from a first RFID tag attached to each asset in the vertical stack of asset, and the vertically spaced antennas on the second tower are configured to acquire a signal strength from a second RFID tag attached to each asset in the vertical stack of assets, and wherein the computer-executable instructions of the asset management system are configured to compare the signal strengths acquired from the first and second RFID tags on each asset and a known elevation of each antenna in the first and second towers to determine the vertical order of individual assets in the vertical stack of assets.

Aspect 5: The system of aspect 4, wherein the first and second RFID tags are attached at sides of the individual assets closest to the first and second towers, respectively.

Aspect 6: The system according to any one of aspects 1 to 5, further comprising an indicator light configured to indicate a pass state and a fail state, wherein: the pass state indicates the vertical order of individual RFID tags attached to the individual assets in the vertical stack of assets matches a desired order as listed in the inventory manifest; and the fail state indicates the vertical order of individual RFID tags attached to the individual assets in the vertical stack of assets does not match the desired order as listed in the inventory manifest.

Aspect 7: The system according to any one of aspects 1 to 6, wherein the RFID reader comprises a memory that stores computer-executable instructions, and at least one processor configured to access the memory and execute the computer-executable instructions to at least: read the individual RFID tags associated with the individual assets in the vertical stack of assets.

Aspect 8: The system according to any one of aspects 1 to 7, wherein the system comprises a first RFID reader in communication with the vertically spaced antennas in the first tower, and a second RFID reader in communication with the vertically spaced antennas in the second tower.

Aspect 9: The system according to any one of aspects 1 to 8, wherein each of the first and second towers comprise at least three antennas positioned vertically at known elevations.

Aspect 10: The system according to any one of aspects 1 to 9, wherein each of the first and second towers comprise at least four antennas positioned vertically at known elevations.

Aspect 11: The system according to any one of aspects 1 to 10, wherein each asset in the vertical stack of assets comprises at least two RFID tags.

Aspect 12: The system according to aspect 11, wherein the RFID tags are attached at sides of the individual assets closest to the first and second towers.

Aspect 13: The system according to any one of aspects 1 to 12, wherein the RFID tags comprise a bar code, human readable information, or a combination thereof.

Aspect 14: A method of vertically sequencing a vertical stack of assets using the system according to any one of aspects 1 to 13, the method comprising: passing a vertical stack of assets between the first and second towers, and registering a pass state or a fail state, wherein the pass state indicates the vertical order of individual RFID tags attached to the assets in the vertical stack of assets matches a desired order as listed in an inventory manifest; and the fail state indicates the vertical order of individual RFID tags attached to the individual assets in the vertical stack of assets does not match the desired order as listed in the inventory manifest.

Aspect 15: A method for vertical sequencing of assets, the method comprising: providing a vertical stack of assets comprising at least two assets; passing the vertical stack of assets between at least two horizontally spaced apart towers, each tower comprising at least two vertically spaced apart RFID antenna; reading, via an RFID reader in electronic communication with the RFID antenna, signals from a plurality of RFID tags associated with the vertical stack of assets; transmitting data related to a signal strength from the RFID tags to an asset management system comprising at least one processor configured to execute computer-executable instructions to determine a vertical order of individual RFID tags attached to the assets in the vertical stack of assets.

Aspect 16: The method according to aspect 15, further comprising: determining the vertical order of individual RFID tags by comparison of the signal strength from each RFID tag received by the vertically spaced RFID antennas and a known elevation of each antenna in the towers.

Aspect 17: The method according to aspect 15 or 16, wherein the vertically spaced apart RFID antennas on a first of the at least two towers are configured to acquire the signal strength from a first RFID tag attached on a first side of each asset in the vertical stack of assets, and the vertically spaced apart RFID antennas on a second of the at least two towers are configured to acquire the signal strength from a second RFID tag attached on a second side of each asset in the vertical stack of assets, wherein the method further comprises: determining the vertical order of individual RFID tags by comparison of the signal strengths acquired from the first and second RFID tags on each asset and a known elevation of each antenna in the first and second towers to determine the vertical order of individual assets in the vertical stack of assets.

Aspect 18: The method according to aspect 17, wherein the first and second RFID tags are attached at sides of the individual assets closest to the first and second towers, respectively.

Aspect 19: The method according to any one of aspects 15 to 18, wherein each at least two towers comprise at least three vertically spaced apart RFID antenna, or at least four vertically spaced apart RFID antenna.

Aspect 20: The method according to any one of aspects 15 to 19, wherein the RFID tags comprise a bar code, human readable information, or a combination thereof.

Aspect 21: The method according to any one of aspects 15 to 20, further comprising: determining, by the asset management system, a pass state or a fail state, wherein: the pass state indicates the vertical order of individual RFID tags attached to the assets in the vertical stack of assets matches a desired order as listed in an inventory manifest; and the fail state indicates the vertical order of individual RFID tags attached to the individual assets in the vertical stack of assets does not match the desired order as listed in the inventory manifest.

Aspect 22: The method according to aspect 21, further comprising: when the pass state is found, proceeding with transport of the vertical stack of assets; and when the fail state is found, ceasing transport of the vertical stack of assets.

What is claimed is:

1. An RFID based sequencing system, comprising:
a first tower comprising at least two vertically spaced antennas, positioned to create at least a first plurality of read zones, configured to transmit RFID signals to acquire information from RFID tags attached to individual assets in a vertical stack of assets;
a second tower comprising at least two vertically spaced antennas, positioned to create at least a second plurality of read zones, configured to transmit RFID signals to acquire information from RFID tags attached to the individual assets in the vertical stack of assets, wherein the first and second towers are spaced apart from each other such that the vertical stack of assets can pass therebetween;
an RFID reader in communication with each antenna of the first and second towers; and an asset management system comprising at least one processor configured to communicate with the RFID reader, and a memory that stores an inventory manifest and computer-executable instructions configured to:
determine an identify of each of the assets in the vertical stack of assets based on the RFID tags attached to each of the individual assets, and
determine a vertical position of each of the RFID tags attached to each of the individual assets in the vertical stack of assets by comparison of a first signal strength received from at least a first RFID tag in the first plurality of read zones with a second signal strength received from at least a second RFID tag in the second plurality of read zones.

2. The system of claim 1, wherein the vertically spaced antennas on the first tower are configured to acquire a signal strength from a first RFID tag attached to each asset in the vertical stack of assets, and the vertically spaced antennas on the second tower are configured to acquire a signal strength from a second RFID tag attached to each asset in the vertical stack of assets, and wherein the computer-executable instructions of the asset management system are configured to compare the signal strengths acquired from the first and second RFID tags on each asset and a known elevation of each antenna in the first and second towers, respectively, to determine a vertical order of individual assets in the vertical stack of assets.

3. The system of claim 2, wherein the first and second RFID tags are attached to the individual assets proximate to the first and second towers, respectively.

4. The system of claim 1 comprising an indicator light configured to indicate a pass state and a fail state, wherein:
the pass state indicates the vertical order of individual RFID tags attached to the individual assets in the vertical stack of assets matches a desired order as listed in the inventory manifest; and
the fail state indicates the vertical order of individual RFID tags attached to the individual assets in the vertical stack of assets does not match the desired order as listed in the inventory manifest.

5. The system of claim 1, wherein the RFID reader comprises a memory that stores computer-executable instructions, and at least one processor configured to access the memory and execute the computer-executable instructions to at least: read the individual RFID tags associated with the individual assets in the vertical stack of assets.

6. The system of claim 1, wherein the system comprises a first RFID reader in communication with the vertically spaced antennas in the first tower, and a second RFID reader in communication with the vertically spaced antennas in the second tower.

7. The system of claim 1, wherein each of the first and second towers comprise at least three antennas positioned vertically at known elevations.

8. The system of claim 1, wherein each of the first and second towers comprise at least four antennas positioned vertically at known elevations.

9. An RFID based sequencing system comprising:
a first tower comprising at least two vertically spaced antennas, positioned to create at least a first plurality of read zones, configured to transmit RFID signals to acquire information from RFID tags attached to individual assets in a vertical stack of assets;

a second tower comprising at least two vertically spaced antennas, positioned to create at least a second plurality of read zones, configured to transmit RFID signals to acquire information from RFID tags attached to the individual assets in the vertical stack of assets, wherein the first and second towers are spaced apart from each other such that the vertical stack of assets can pass therebetween;

an RFID reader in communication with each antenna of the first and second towers;

an asset management system comprising at least one processor configured to communicate with the RFID reader, and a memory that stores an inventory manifest and computer-executable instructions configured to:

determine an identity of each of the assets in the vertical stack of assets based on the RFID tags affixed to each of the individual assets, determine a vertical position of each of the RFID tags attached to each of the individual assets in the vertical stack of assets by comparison of a signal strength from at least a first RFID tag received in the first plurality of read zones with a second signal strength received from at least a second RFID tag in the second plurality of read zones; and an indicator light configured to indicate a pass state and a fail state, wherein:

the pass state indicates the vertical position of each of the RFID tags attached to the individual assets in the vertical stack of assets matches a desired position as listed in the inventory manifest, and the fail state indicates the vertical position of each of the RFID tags attached to the individual assets in the vertical stack of assets does not match the desired position as listed in the inventory manifest.

10. The system of claim 9, wherein each of the first and second towers comprise at least four antennas positioned vertically at known elevations.

11. A method for vertical sequencing of assets, the method comprising: passing a vertical stack of assets between at least two horizontally spaced apart towers, each tower comprising at least two vertically spaced apart RFID antenna, positioned to create at least a plurality of read zones;

reading, via an RFID reader in electronic communication with the RFID antenna, a first signal and a second signal strength from a plurality of RFID tags associated with the vertical stack of assets;

transmitting data related to the first and second signal strengths to an asset management system comprising at least one processor configured to execute computer-executable instructions to determine a vertical position of each of the RFID tags attached to the assets in the vertical stack of assets by comparison of the first signal strength from at least one of the individual RFID tags received from at least a first tower, with the second signal strength from at least another of the each of the individual RFID tags received from at least a second tower, and received in the plurality of read zones.

12. The method of claim 11, wherein the vertically spaced apart RFID antennas on a first of the at least two towers are configured to acquire the first signal strength from a first RFID tag attached on a first side of each asset in the vertical stack of assets, and the vertically spaced apart RFID antennas on a second of the at least two towers are configured to acquire the second signal strength from a second RFID tag attached on a second side of each asset in the vertical stack of assets, wherein the method comprises:

determining the vertical order of individual RFID tags by comparison of the first and second signal strengths acquired from the first and second RFID tags on each asset and a known elevation of each antenna in the first and second towers to determine the vertical order of individual assets in the vertical stack of assets.

13. The method of claim 12, wherein the first and second RFID tags are attached to the individual assets proximate to the first and second towers, respectively.

14. The method of claim 11, wherein each of the at least two towers comprise at least three vertically spaced apart RFID antenna.

15. The method of claim 11, wherein each of the at least two towers comprise at least four vertically spaced apart RFID antenna.

16. The method of claim 11, wherein the RFID tags comprise at least one of a bar code and human readable information.

17. The method of claim 11 comprising:

determining, by the asset management system, a pass state or a fail state, wherein:

the pass state indicates the vertical order of individual RFID tags attached to the assets in the vertical stack of assets matches a desired order as listed in an inventory manifest; and the fail state indicates the vertical order of individual RFID tags attached to the individual assets in the vertical stack of assets does not match the desired order as listed in the inventory manifest.

18. The method of claim 7 comprising one of:

when the pass state is determined, proceeding with transport of the vertical stack of assets; and when the fail state is determined, ceasing transport of the vertical stack of assets.

19. The system of claim 1, wherein the signal strength is calibrated to account for signal bounce.

20. The system of claim 9, wherein the signal strength is calibrated to account for signal bounce.

\* \* \* \* \*